United States Patent [19]

Popinski

[11] 4,307,575
[45] Dec. 29, 1981

[54] AUTOMOTIVE ABSORPTION AIR CONDITIONER UTILIZING SOLAR AND MOTOR WASTE HEAT

[76] Inventor: Robert A. Frosch, Administrator of the National Aeronautics and Space Administration, with respect to an invention of Zenon Popinski, Alhambra, Calif.

[21] Appl. No.: 173,519

[22] Filed: Jul. 30, 1980

[51] Int. Cl.³ .................. F25B 15/00; F25B 27/02
[52] U.S. Cl. ................................. 62/148; 62/235.1; 62/238.3; 62/239; 62/244; 62/476
[58] Field of Search ................ 62/2, 238.3, 323.2, 62/239, 240, 243, 244, 148, 476

[56] References Cited

U.S. PATENT DOCUMENTS

| | | | |
|---|---|---|---|
| 2,953,907 | 9/1960 | DeCicco et al. | 62/148 |
| 3,470,707 | 10/1969 | Lofgreen et al. | 62/238.3 X |
| 3,943,726 | 3/1976 | Miller | 62/2 |
| 4,179,895 | 12/1979 | Shimokawr et al. | 62/476 X |

*Primary Examiner*—Lloyd L. King
*Attorney, Agent, or Firm*—Thomas H. Jones; John R. Manning

[57] ABSTRACT

In combination with the ground vehicle A powered by a waste heat generating electric motor 16, a cooling system 10 including a generator 17 for driving off refrigerant vapor from a strong refrigerant-absorbant solution, including a solar collector 12, an air-cooled condenser 30 connected with the generator for converting the refrigerant vapor to its liquid state, an air-cooled evaporator 38 connected with the condenser for returning the liquid refrigerant to its vapor state, and an absorber 18 is connected to the generator and to the evaporator for dissolving the refrigerant vapor in the weak refrigerant-absorbant solution, for thus providing a strong refrigerant solution, a pump 22 for establishing a pressurized flow of strong refrigerant-absorbant solution from said absorber through the electric motor, and thence to the collector.

1 Claim, 2 Drawing Figures

AUTOMOTIVE ABSORPTION AIR CONDITIONER UTILIZING SOLAR AND MOTOR WASTE HEAT

ORIGIN OF THE INVENTION

The invention described herein was made in the performance of work under a NASA Contract and is subject to the provisions of Section 305 of the National Aeronautics & Space Act of 1958, Public Law 85-568 (72 STAT 435; 42 U.S.C. 2457).

BACKGROUND OF THE INVENTION

The invention generally relates to automotive air conditioning systems and more particularly to absorption cycle air conditioning systems for use as space cooling systems in electrically powered vehicles. For the sake of convenience, absorption cycle air conditioning systems and absorption cycle refrigeration systems are herein referred to as absorption air conditioning and absorption refrigeration systems, respectively.

Currently, substantial efforts are being made to develop both all-electric subcompact vehicles, as well as hybrid-electric vehicles, or those which utilize power derived from both fuel-burning and electrical sources. As far as is known by the instant inventor, however, even though there is a recognized apparent need to provide for space cooling in such vehicles, very little effort has been devoted to providing low-energy systems capable of providing for spacing heating and cooling, for either all-electric, or hybrid-electric vehicles. One suggested reason for the apparent dearth of space heating and cooling systems for such vehicles is the general reluctance on the part of designers to impose weight and energy penalties in the design of electrically driven vehicles.

It will, of course, be appreciated that in the interest of conservation of energy, it is highly desirable that any space cooling system employed for electrically powered vehicles be characterized by a capability for maximizing space cooling, without imposing significant weight and energy requirement penalties on the design thereof.

It is, therefore, the general purpose of the instant invention to provide in combination with an electrically powered vehicle, either all-electric, or hybrid-electric, a space cooling system which is of a lightweight design and has a capability for achieving vehicular space cooling with minimal attendant power requirements.

OBJECTS AND SUMMARY OF THE INVENTION

It is an object of the instant invention to provide an improved space cooling system for self-propelled vehicles.

It is another object to provide in combination with a self-propelled vehicle, characterized by a waste heat generating source of locomotive force, an improved absorption air conditioning system.

It is another object to provide in combination with a ground vehicle having a source of locomotive force comprising an electric motor characterized by a propensity to generate waste heat, and an absorption air conditioner adapted to function as a space cooling system, a solar collector adapted to cooperate with the motor in supplying the required heat necessary for vaporizing a liquid refrigerant.

It is another object to provide in an absorption refrigerator adapted to be employed as a space cooling system for a vehicle having a propulsion system including an electric motor, a solar energy collector and a conduit connecting in communication the collector and motor whereby a pressurized flow of a strong refrigerant absorber solution may be caused to flow through the motor and the collector for purposes of extracting heat therefrom, said heat to be employed in driving refrigerant vapor from the strong solution of refrigerant.

These and other objects and advantages are achieved through the use of an absorption air conditioning system and a solar energy collector coupled in a circuit including a conduit for conducting a flow of liquid refrigerant through the housing of an electric motor, adapted to be employed as a source of locomotive force for a vehicle, for thereby extracting from the motor waste heat to be added to solar energy derived from the collector and used in vaporizing the liquid refrigerant in an absorption cycle, as will become more readily apparent by reference to the following description in claims in light of the accompanying drawings.

DESCRIPTION OF THE PREFERRED EMBODIMENT

Figure 1:
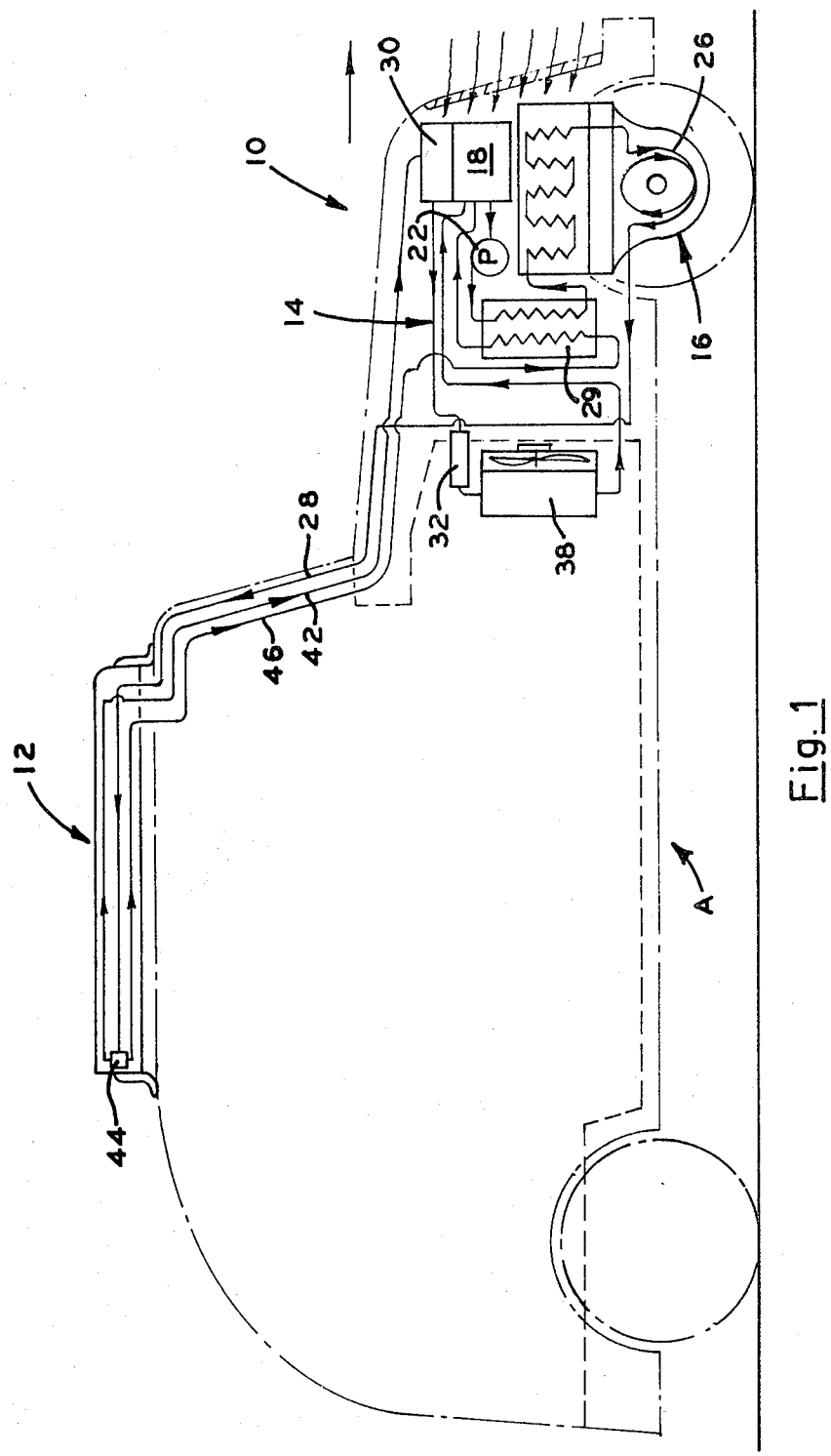
FIG. 1 is a schematic view schematically illustrating an absorption air conditioning system adapted to utilize solar and motor waste heat in the space cooling of a vehicle.

Referring now to the drawings, with more particularity, wherein like reference characters designate like or corresponding parts throughout the several views, there schematically is shown in FIG. 1, an automobile, generally designated A, equipped with an absorption air conditioning system, generally designated 10, embodying the principles of the instant invention.

As shown in the drawings, the system 10 includes a solar collector 12 consisting of a black body, flat plate collector. The collector 12 is, in turn, connected to an absorption refrigerator system 14 adapted to perform a space cooling function as a liquid refrigerant is caused to vaporize and liquify, or pass through an absorption cycle, in a manner well understood by those familiar with such devices.

Briefly, for an absorption refrigerator, the most commonly employed refrigerant is ammonia and the absorbant, water. Usually, such systems are provided with condensers, expansion valves, and evaporators, essentially the same components as are employed by vapor-compression systems, or those systems having a capability of achieving space cooling by causing a refrigerant to pass through vapor-compression cycles. However, it is important here to note that instead of a compressor as employed in a vapor-compression system, an absorber, generator, pump and a heat exchanger are employed instead of the compressor. The operation of such a system is based on the principles that the vapor pressure of the refrigerant is lowered by the addition of an absorbant having a lower vapor pressure; the greater the quantity of the absorbant used, the greater the depression of the vapor pressure of the refrigerant. By maintaining the solution in the absorber at a low temperature and concentration, the vapor pressure of the solution can be kept lower than that of the refrigerant in the associated evaporator. Spraying the weak solution into the absorber causes the refrigerant vapor to flow from the evaporator to the absorber. A strong solution thus is formed in the absorber as the vapor is absorbed by the solution. The strong solution is then pumped through a heat exchanger to the generator, and thus pressurized, where heat is applied to again release the refrigerant vapor. Then follows condensation, expansion, and evaporation, as in the well-known vapor-compression systems for causing the refrigerant to pass through a standard vapor-compression cycle. Of course, as is also well known, it is possible to utilize water as a refrigerant and lithium bromide as an absorbant. Finally, it is noted that a hot weak solution results from the refrigerant vapor being driven from the refrigerant solution in the generator. The resultant hot weak solution is fed back to the absorber, through a heat exchanger through a pressure reducing valve.

Since the operation of systems such as the aforedescribed absorption refrigerator generally are well known, a more detailed description thereof is deemed to be unnecessary and is omitted in the interest of brevity. However, it is important to appreciate that the absorption refrigerator 14 comprises such as system.

Figure 2:
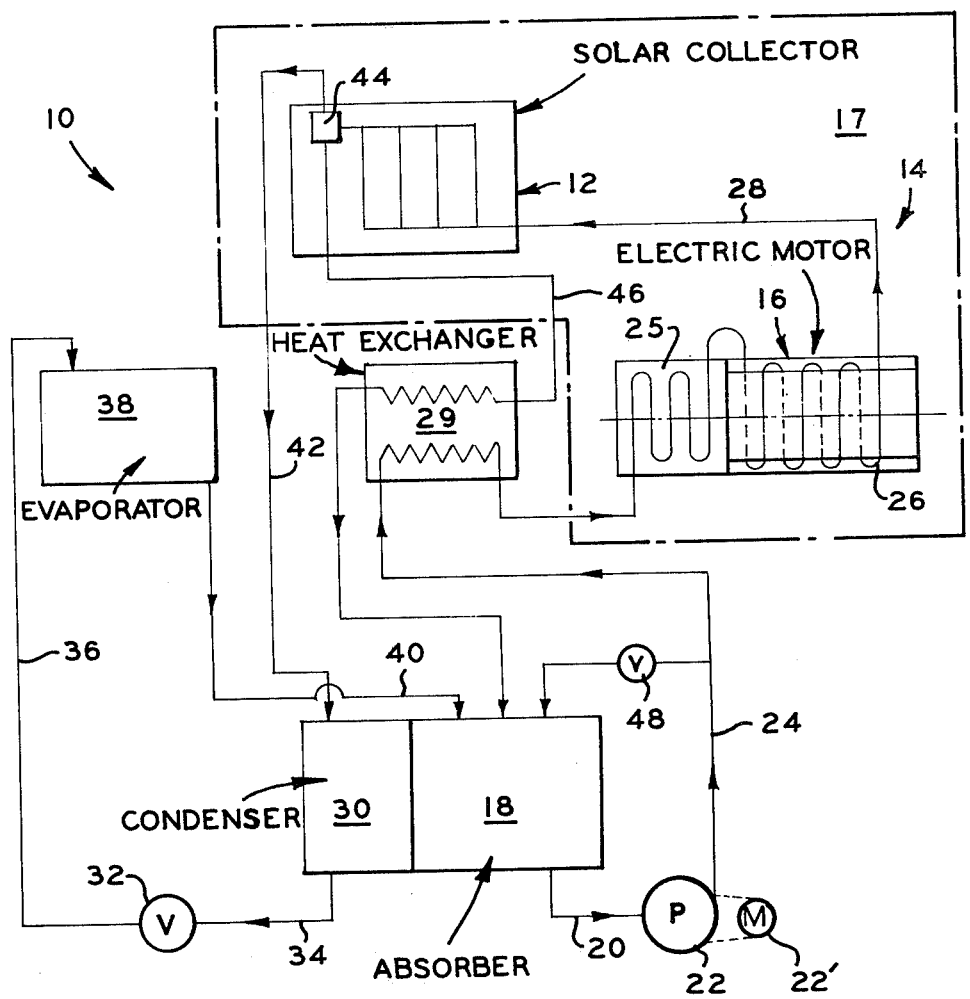
FIG. 2 is a view diagrammatically illustrating the system shown in FIG. 1.

Referring for a moment to FIG. 2, it is noted that the system 10 also includes an electric motor of conventional design, generally designated 16. The motor 16 comprises a waste-heat generating source of locomotive force employed in propelling the vehicle A. As shown in the drawings, the motor 16 comprises a 200° C. service-temperature motor. Consequently, the black body flat plate solar collector 12 and the electric motor 16 collectively serve as a source of heat to be employed in releasing refrigerant vapor from a flow of strong refrigerant-absorbant solution as the system 10 is caused to function in an absorption cycle. Thus the collector 12 and motor 16 function collectively as a generator, designated 17, for the system.

It also should be noted that the system 10 includes an absorber 18 having a discharge conduit 20 connected at the inlet side of a pressure pump 22 driven by a suitable motor 22'. At the output side of the pump 22 there is connected a high pressure system, not designated. The high pressure system includes a high pressure conduit 24 projected through an air cooling stage 25 to connect with a heat extracting conduit 26. The conduit 26 passes through suitable ports provided for the housing of the motor 16 and is extended into a connected relation with the solar collector 12, via a high pressure conduit 28. Hence, the conduit 26 serves to deliver to the collector 12, under high pressure, a strong refrigerant-absorbant solution. It is important here to note, also, that the high pressure conduit 24 passes through a heat exchanger 29 located between the pump 22 and the electric motor 16, for the extraction of heat, as will hereinafter become more fully discussed.

The system 10 also includes a condenser 30, of known design, having connected thereto a low pressure system, also not designated. The low pressure system is connected to the outlet of the condenser and includes an expansion valve 32 connected to the outlet of the condenser via a suitable conduit 34. Connected to the outlet side of the expansion valve 32, there is a low pressure conduit 36 adapted to deliver the output from the expansion valve 32 to an evaporator 38, also of known design. The evaporator 38, in turn, includes a return outlet connected to an inlet side of the absorber 18, via a low pressure conduit 40. It should now be apparent that the system 10 is provided with a high pressure as well as a low pressure subsystem.

In practice, a high pressure conduit 42 serves to interconnect the solar collector 12 with the condenser 30 and a high pressure conduit 46 extended through the heat exchanger 29 serves to connect the collector with the absorber 18. Preferably, a suitable device 44, such as a trap is provided to permit warm weak refrigerant-absorbant solution to gravitate to the absorber 18, via the conduit 46, while a refrigerant vapor, under high pressure, is discharged via the conduit 42 to the condenser 30. The conduit 46, as it passes through the heat exchanger 29, permits heat to be given up from the warm weak refrigerant-absorbant solution to the cooler strong refrigerant-absorbant solution as it is conducted through the heat exchanger via the conduit 24. Thus the weak solution is cooled prior to delivery to the absorber.

The design of the trap 44 is of no particular consequence and may be varied as desired. It suffices to understand that refrigerant vapor is separated at the trap, or similar device, from the liquid solution. Therefore, a detailed description of the trap 44 is deemed to be unnecessary in order to provide for a complete understanding of the invention and is omitted in the interest of brevity.

Additionally, while not shown, it is to be understood that weak solution is discharged to the absorber 18 via a pressure reducing valve internally related to the absorber 18. Also, it is noted that, as desired, a relief system including a pressure release valve 48 is provided to establish a return path from the output side of the pump 24 to the absorber 18, in the event pressure within the conduit 24 exceeds a desired pressure value.

OPERATION

It is believed that in view of the foregoing description, the operation of the invention herein disclosed and claimed readily is apparent. However, in the interest of completeness, the operation of the disclosed embodiment of the invention is, at this point, briefly reviewed.

With the system 10 assembled in the manner hereinbefore described and mounted in a self-propelled vehicle, such as an automobile equipped with an all-electric or hybrid-electric source of locomotive force, the system is prepared for performing space cooling operations as the vehicle is propelled by force provided by the waste heat generating motor 16 and solar radiation that is incident on the collector 12.

The auxiliary motor 22' is activated for initiating operation of the pump 22, causing the pump 22 now to draw a liquid refrigerant comprising a strong refrigerant-absorbant water and ammonia solution from the absorber 18, via the conduit 20, and discharge the solution under pressure to the conduit 24 and thence to the conduit 26.

However, as the solution under pressure passes through the heat exchanger 29, heat is extracted therefrom by the strong solution. The heat extracted therefrom is, in practice, given up at the heat exchanger by the weak solution as it passes therethrough on its way from the trap 44 to the absorber 18, as will be more fully discussed. This heat, at least in part, is given up to ambient atmosphere at the air cooling stage 25 is order to facilitate extraction of the heat from the motor 16.

The strong, pressurized refrigerant-absorbant solution passes from the conduit 24 to the conduit 26, at which time heat is transferred from the motor 16 to the solution, which now is conducted away from the motor via the conduit 28. The strong refrigerant-absorbent solution, now under pressure and heated, is discharged to the solar collector 12 at which heat or solar energy is transferred to the refrigerant-absorbant solution. The additional heat thus transferred to the solution at the solar collector, causes the liquid refrigerant, or ammonia, to be boiled off. The thus vaporized refrigerant is transferred to the condenser 30, via the conduit 42. The condenser 30 is cooled as a stream of air is caused to flow thereover in response to motion imparted to the vehicle. The ammonia now is returned to its liquid state, at the condenser, and subsequently is discharged to the expansion valve 32, via the conduit 34. At the expansion valve 32 the liquid refrigerant is discharged to the evaporator 38, via the conduit 36, at which point evaporation and space cooling occurs.

The refrigerant as a low pressure vapor now is drawn back into the absorber 18 via a spray head not shown and caused to be absorbed by the cool weak refrigerant-absorbant solution delivered to the absorber 18 via the conduit 46.

It is here noted that the weak refrigerant-absorbant solution is heated and under pressure as it exits the trap 44, via the conduit 46, and that the temperature thereof is reduced as its heat is given up to the cooler, strong refrigerant-absorbant solution at the heat exchanger 29. Consequently, the weak refrigerant-absorbant solution is cooled prior to being discharged to the absorber 18, via a pressure reducing valve, not shown, as aforementioned. In order to achieve desired cooling, the absorber 18 and the condenser 30 are located within the vehicle A at a point such that an airstream is caused to flow thereover in response to motion being imparted to the vehicle.

The cool refrigerant vapor delivered to the absorber 18, via the conduit 40, and the spray head not shown, and the cool weak refrigerant-absorbant solution delivered to the absorber 18, via the conduit 46 and the pressure reducing valve, also not shown, is caused to form a strong refrigerant-absorber solution to be returned to the generator 17.

As should now be apparent, the energy inputs to the system include a small electrical power input to the motor 22', for the pump 22, and a large thermal energy input to the generator 17. The bulk of the energy input, however, comprises the heat supplied as waste heat generated by the electric motor 16. During periods of hill climbing, or other overload conditions, an increased thermal output from the motor 16 is experienced. However, the waste heat is extracted by the liquid refrigerant, or strong solution, flowing through the conduit 26.

In this manner, the system of the instant invention also serves substantially to prevent overheating of the motor and increases service life and efficiency of the motor 16.

In view of the foregoing, it is believed to be readily apparent that the invention embodying the principles of the instant invention provides a practical solution to the problems heretofore encountered in providing for space cooling upon electrically powered vehicles.

What is claimed is:

1. In combination with a ground vehicle powered by a waste heat generating electric motor, a space cooling system comprising:

A. an air-cooled condensor for converting refrigerant vapor to a liquid;
   B. means including an air-cooled absorber wherein a refrigerant gas is dissolved in a weak refrigerant-absorbant solution for thus forming a strong refrigerant-absorbant solution;
   C. generator means for heating said solution comprising:
   a heat extracting conduit passing through the housing of said electric motor for conducting the strong refrigerant-absorbant solution through the motor in a heat exchange relationship therewith simultaneously with a generation of waste heat by said motor, whereby waste heat generated by said motor is transferred from the motor to the strong refrigerant-absorbant solution, a black body, flat plate solar collector mounted on said vehicle and connected to said conduit in solution-receiving relation therewith for transferring solar heat to said strong refrigerant-absorbant solution for converting the strong refrigerant-absorbant solution to a vapor and a residue of a weak refrigerant-absorbant solution, means for directing the weak refrigerant-absorbant solution to the absorber and delivering said vapor to the condenser, whereby the vapor is converted to a liquid refrigerant;
   D. a space cooling evaporator connected to the condensor for receiving and converting the liquid refrigerant to a gas;
   E. means connected between the absorber and the generator for directing the weak refrigerant-absorbant solution to the absorber from the generator and means connected between the absorber and the evaporator for delivering to the absorber refrigerant gas to be dissolved in the weak refrigerant-absorbant solution for thereby providing a strong refrigerant-absorbant solution output from the absorber.

* * * * *